(12) United States Patent
Sheppard et al.

(10) Patent No.: US 11,933,733 B2
(45) Date of Patent: Mar. 19, 2024

(54) NON-DESTRUCTIVE GLASS PRIMING VERIFICATION METHOD FOR INSTALLED GLASS

(71) Applicants: Gloria J Sheppard, Toledo, OH (US); Nick F Bursic, Jr., Oakville (CA); Rachelle E LaLonde, Birmingham, MI (US); Liana A Danciu, Maple (CA); Harry J Glikis, Dearborn, MI (US); Giurgevca Palincas, Clinton Township, MI (US); Brian C Adams, Birmingham, MI (US); Keith Windmill, Shelby Township, MI (US)

(72) Inventors: Gloria J Sheppard, Toledo, OH (US); Nick F Bursic, Jr., Oakville (CA); Rachelle E LaLonde, Birmingham, MI (US); Liana A Danciu, Maple (CA); Harry J Glikis, Dearborn, MI (US); Giurgevca Palincas, Clinton Township, MI (US); Brian C Adams, Birmingham, MI (US); Keith Windmill, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 429 days.

(21) Appl. No.: 17/363,100

(22) Filed: Jun. 30, 2021

(65) Prior Publication Data
US 2023/0003659 A1 Jan. 5, 2023

(51) Int. Cl.
*G01N 21/84* (2006.01)
*B05C 11/10* (2006.01)
(Continued)

(52) U.S. Cl.
CPC ...... *G01N 21/8422* (2013.01); *B05C 11/1021* (2013.01); *B60J 1/004* (2013.01); *G01N 21/95607* (2013.01); *G01N 21/958* (2013.01); *G01N 2021/8433* (2013.01); *G01N 2021/9586* (2013.01)

(58) Field of Classification Search
CPC ....... G01N 21/84232; G01N 21/95607; G01N 21/958; G01N 21/8433; G01N 2021/9586; B05C 11/1021; B60J 1/004
See application file for complete search history.

(56) References Cited

FOREIGN PATENT DOCUMENTS

| EP | 0198497 A2 | * | 10/1986 |
| JP | 2701887 B2 | * | 10/1998 |
| JP | 2007-229567 A | | 9/2007 |

* cited by examiner

*Primary Examiner* — Daniel McNally
(74) *Attorney, Agent, or Firm* — Jeremy J. Klobucar

(57) ABSTRACT

A method of installing a glass panel on a vehicle that includes an opaque coating formed about a perimeter of the glass panel that includes a plurality of voids where the opaque coating is absent. The method includes determining whether a primer has been applied to the opaque coating by inspecting the glass panel to determine whether at least some of the plurality of voids have been covered by the primer. After determining whether a primer has been applied to the opaque coating, it is determined whether the primer has been correctly applied to the opaque coating by inspecting the glass panel to determine whether each of the plurality of voids has been covered by the primer. Then, after determining whether the primer has been correctly applied, an adhesive may be applied to the primer and the glass panel may be installed on the vehicle.

20 Claims, 6 Drawing Sheets

(51) Int. Cl.
*B60J 1/00* (2006.01)
*G01N 21/956* (2006.01)
*G01N 21/958* (2006.01)

NON-DESTRUCTIVE GLASS PRIMING VERIFICATION METHOD FOR INSTALLED GLASS

FIELD

The present disclosure relates to a non-destructive glass priming verification method for installed glass.

BACKGROUND

It is common for a fixed glass panel in a vehicle (e.g., a windshield, quarter glass, and backlite) to have a black ceramic paint coating or band along a perimeter of the fixed glass panel. The ceramic paint band is added for both functional and styling requirements. With respect to the function of the ceramic paint band, the paint band acts as a bonding surface for an adhesive located between the glass panel and the vehicle. The paint band is also typically opaque to act as a protective barrier that prevents ultraviolet (UV) radiation from reaching and degrading the adhesive.

When installing the glass panel in the vehicle, a primer may be applied to the ceramic paint band before applying the adhesive. The primer may be applied to the ceramic paint band by a supplier that provides the glass panel to the vehicle manufacturer such that the manufacturer receives glass panels ready for application of the adhesive, or the primer may be applied by the vehicle manufacturer at the manufacturing facility. In either case, if the glass panel has been installed on the vehicle without first confirming that the glass panel has been properly primed, there is unfortunately no way to determine if the primer has been applied after the glass panel has been installed without destroying the glass panel.

SUMMARY

According to a first aspect of the present disclosure, there is provided a method of installing a glass panel on a vehicle. The method includes providing a glass panel, and disposing an opaque coating on the glass panel about a perimeter of the glass panel. The opaque coating has a plurality of voids provided therein where a material of the opaque coating is absent. The method also includes applying a primer to the opaque coating that is configured for receipt of an adhesive, wherein the plurality of voids serve as a visual guide for application of the primer to the opaque coating.

According to the first aspect, the plurality of voids may include a first plurality of voids that are spaced apart from and aligned with each other such that a first ring of the first plurality of voids is formed along and proximate an outer edge of the opaque coating, and the plurality of voids may include a second plurality of voids that are spaced apart from and aligned with each other such that a second ring of the second plurality of voids is formed along and proximate an inner edge of the opaque coating.

According to the first aspect, the first ring and the second ring are spaced apart from each other, and define a primer application path to guide the applying of the primer to the opaque coating.

According to the first aspect, after application of the primer to the opaque coating, the method may further include determining whether the primer has been correctly applied to the opaque coating by inspecting the glass panel to determine whether the plurality of voids have been covered by the primer.

According to the first aspect, if some of the voids have not been covered by the primer, the method may further include rejecting the glass panel.

According to the first aspect, if the plurality of voids have been covered by the primer, the method may further include applying the adhesive to the primer and installing the glass panel on a vehicle.

According to the first aspect, a center line between the first ring and the second ring may define a location for application of the adhesive to the primer.

According to the first aspect, a color of the primer may match a color of the opaque coating.

According to the first aspect, the glass panel may be a laminated glass panel or a tempered glass panel.

According to a second aspect of the present disclosure, there is provided a method of installing a glass panel on a vehicle, wherein the glass panel includes an opaque coating formed about a perimeter of the glass panel that includes a plurality of voids where the opaque coating is absent that are spaced apart from and aligned with each other about the perimeter of the glass panel. The method includes determining whether a primer has been applied to the opaque coating by inspecting the glass panel to determine whether at least some of the plurality of voids have been covered by the primer. After determining whether a primer has been applied to the opaque coating, the method may include determining whether the primer has been correctly applied to the opaque coating by inspecting the glass panel to determine whether each of the plurality of voids has been covered by the primer, and after determining whether the primer has been correctly applied, the method may include applying an adhesive on the primer and installing the glass panel on the vehicle.

According to the second aspect, if some of the voids have not been covered by the primer, the glass panel may be rejected before applying the adhesive and installing the glass panel on the vehicle.

According to the second aspect, if it is determined that the primer has not been applied to the opaque coating, the method may further include applying the primer to the opaque coating using the plurality of voids as a guide for application of the primer.

According to the second aspect, the plurality of voids may include a first plurality of voids that are spaced apart from and aligned with each other such that a first ring of the first plurality of voids is formed along and proximate an outer edge of the opaque coating, and the plurality of voids may include a second plurality of voids that are spaced apart from and aligned with each other such that a second ring of the second plurality of voids is formed along and proximate an inner edge of the opaque coating.

According to the second aspect, the first ring and the second ring are spaced apart from each other, and may define a primer application path to guide the applying of the primer to the opaque coating.

According to the second aspect, after the applying of the primer to the opaque coating, the method may further include determining whether the primer has been correctly applied to the opaque coating by inspecting the glass panel to determine whether the first and second rings have been covered by the primer.

According to the second aspect, a center line between the first ring and the second ring may define a location for application of the adhesive to the primer.

According to the second aspect, a color of the primer may match a color of the opaque coating.

According to the second aspect, the glass panel may be a laminated glass panel or a tempered glass panel.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
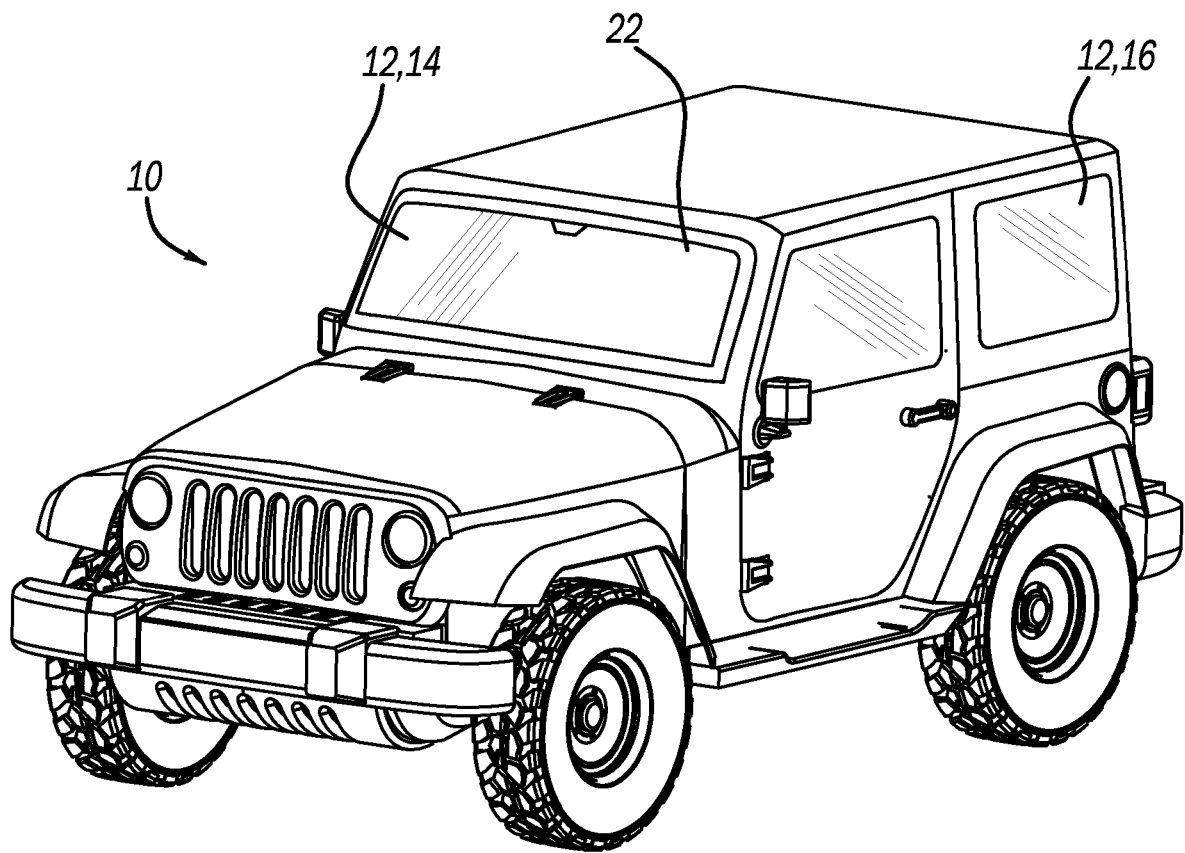
FIG. 1 illustrates a vehicle having a plurality of fixed glass panels.

FIG. 1 illustrates a vehicle 10 having a plurality of fixed glass panels 12 including a windshield 14, a quarter-glass panel 16, and a rear glass panel (not illustrated). Glass panels 12 may be laminated glass panels (e.g., when glass panel 12 forms windshield 14), or glass panels 12 may be tempered glass panels (e.g., when glass panel 12 forms quarter-glass panel 16 or rear glass panel (not illustrated)).

Figure 2:
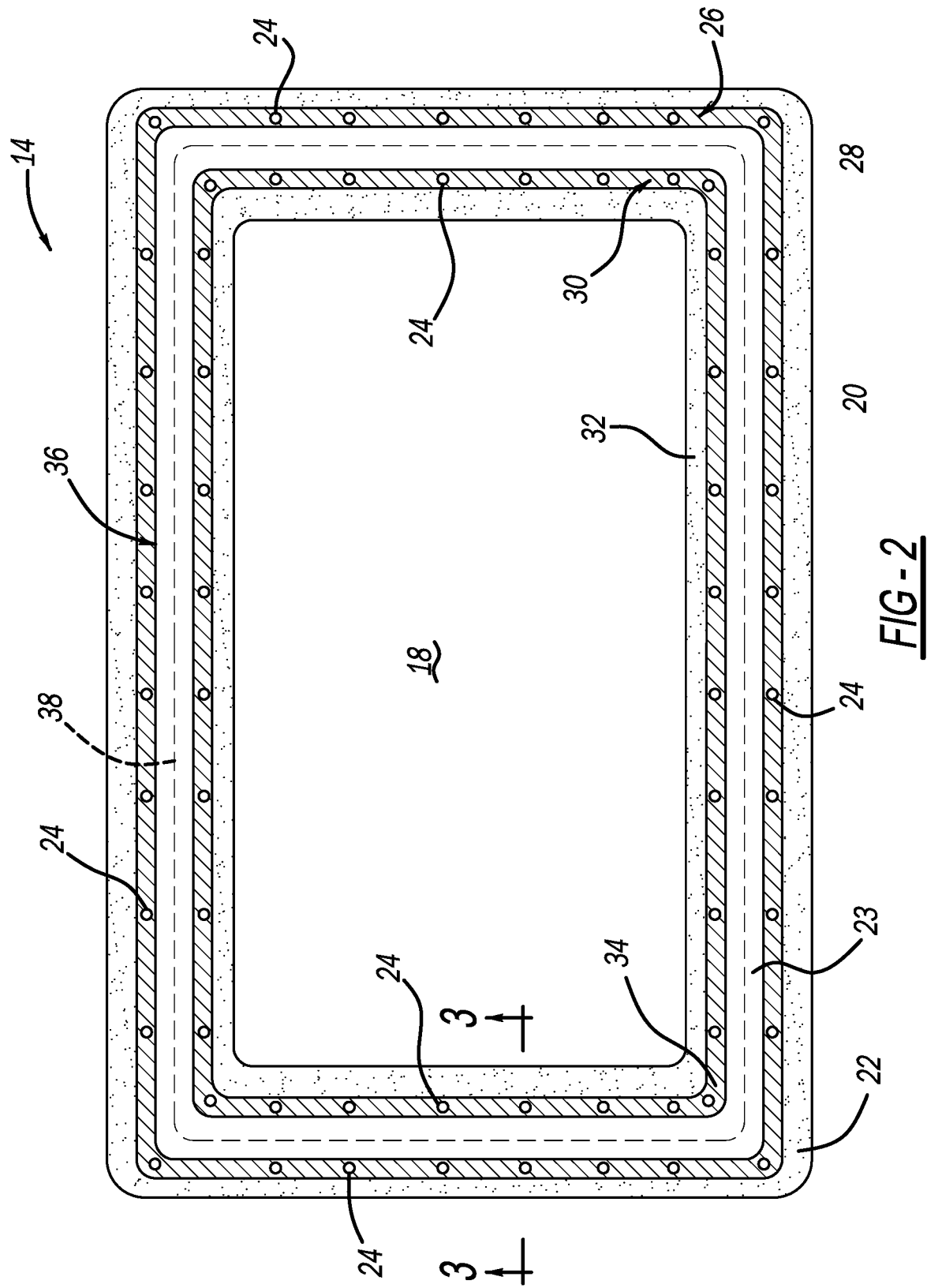
FIG. 2 is a schematic perspective view of an example uninstalled glass panel that may be used on the vehicle illustrated in FIG. 1.

FIG. 2 illustrates an example windshield 14 in an uninstalled state. Although FIG. 2 illustrates a windshield 14, it should be understood that a similar configuration may be used on either quarter-glass panel 16 or a rear glass panel (not illustrated). Regardless, windshield 14 includes a glass body 18 having an outer perimeter 20. An opaque ceramic paint coating or band 22 has been applied to the glass body 18 that extends about perimeter 20. While band 22 has been described as being formed of a ceramic paint, other opaque coatings known to one skilled in the art are contemplated. A width W (FIG. 3) of paint band 22 may range between two to four inches, although the width W is variable. Paint band 22 is configured for receipt of an adhesive 23 that bonds windshield 14 to vehicle 10, in addition to acting as a UV light blocker to prevent degradation of adhesive 23 when installed on vehicle 10. In addition, paint band 22 includes a plurality of voids 24, which are locations where the ceramic paint of paint band 22 is absent. In the illustrated embodiment, voids 24 are circle-shaped, but may be any shape desired (e.g., square, oval, triangular, etc.). Voids 24 may be formed by applying a mask (not illustrated) to glass panel 12 before forming paint band 22. A diameter of voids 24 may be about two millimeters, which enables voids 24 to be large enough to serve as a visual indicator and small enough to not be noticed when covered by a primer, as will be described in more detail later. It should be understood, however, that the diameter or size of voids 24 is variable and may include diameters and sizes greater than or less than two millimeters, as desired.

An outer ring 26 of voids 24 travels along and proximate an outer edge 28 of paint band 22. An inner ring 30 of voids 24 travels along and proximate an inner edge 32 of paint band 22. In the illustrated embodiment, voids 24 of inner ring 30 may be aligned with the voids 24 of the outer ring 26. Such a configuration, however, is not required. In this regard, the voids 24 of inner ring 30 may be staggered relative to the voids 24 of the outer ring 26, if desired.

Before applying adhesive 23 to paint band 22 and installing windshield 14 to vehicle 10, a primer 34 must be applied to paint band 22. It is important that primer 34 be applied to paint band 22 before applying adhesive 23 to the paint band 22 because primer 34 is formed of a material that reacts with (e.g., cures) the material (e.g., urethane) of the adhesive 23 to increase the bond strength between the adhesive 23 and glass panel 12. If the primer 34 is not present, the adhesive bond between the adhesive 23 and glass panel 12 will not be satisfactory over an extended period of time.

The rings 26, 30 of voids 24 define a path 36 for application of primer 34 to paint band 22. Specifically, outer ring 26 of voids 24 defines a general outer boundary for the primer path 36 and inner ring 30 defines a general inner boundary for the primer path 36 that are spaced apart at a distance such that a centerline 38 of primer path 36 lies between the rings 26, 30 of voids 24, and such that the distance between the rings 26, 30 enables the voids 24 to be covered by the primer 34 after application thereof. The primer 34 may be black in color, which may match the color of paint band 22.

More importantly, if primer 34 is applied to primer path 36 correctly, the voids 24 of each ring 26, 30 will be covered by the primer 34, which enables determining whether the primer 34 has been applied to the paint band 22 before applying the adhesive 23 to the paint band 22, and also enables determining whether the primer 34 has been installed properly to paint band 22. In other words, when voids 24 are covered by primer 34, the lack of voids 24 serves as a visual indicator that primer 34 has been applied to paint band 22, and also serves as a visual indicator that the primer 34 has been applied correctly. In addition, if primer 34 is to be manually applied to paint band 22 by either the supplier or manufacturer, it should be understood that voids 24 act as a visual guide for application of primer 34 to paint band 22. Alternatively, if primer 34 is to be applied by an automated process (e.g., by a robot or some other type of mechanical application device) by either the supplier or manufacturer, the voids 24 may also be used as a visual guide to verify the automated process set-up is correct for application of primer 34 to paint band 22. Moreover, it should be understood that if the glass panels 12 are provided by a supplier with primer 34 already attached to paint band 22, the presence or lack of voids 24 may be used as a visual guide by the manufacturer when inspecting one or a plurality of glass panels 12 before installation on vehicle 10.

A distance between adjacent voids 24 in each ring 26, 30 may be in the range between one to three inches, but is variable. In addition, a distance between a void 24 in ring 26 and a void 24 in ring 30 may be in the range of one to three inches, but is variable, may be dependent on a width of paint band 22, and should be sufficient to permit adhesive 23 to be positioned between each ring 26, 30 such that adhesive 23 will not cover any of the voids 24 when compressed and spread out between glass panel 12 and vehicle 10. It is not desirable for adhesive 23 to cover a void 24 to ensure that adhesive 23 is not exposed to UV radiation when installed on the vehicle 10—even if void 24 is covered by primer 34. A greater number of voids 24 may increase the likelihood that it can be determined whether primer 34 has been applied to paint band 22, or determined that primer 34 has been applied correctly to paint band 22.

Figure 3:
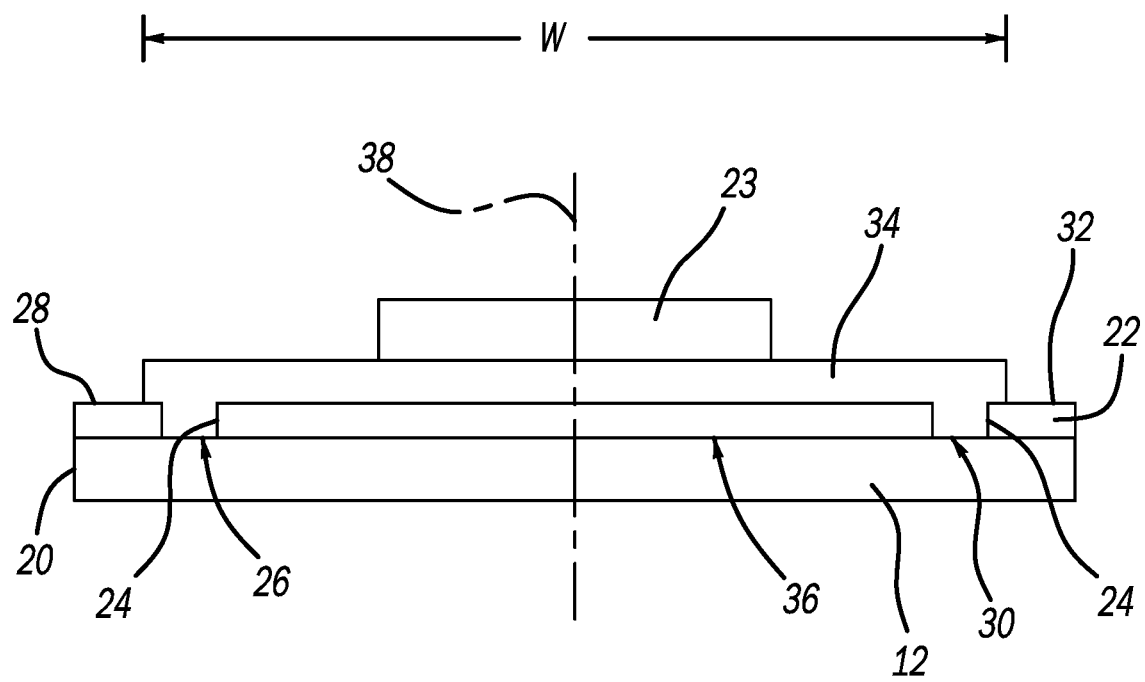
FIG. 3 is a schematic cross-sectional view of the glass panel illustrated in FIG. 2 along line 3-3 prior to installation on the vehicle.

FIGS. 2 and 3 illustrate when primer 34 has been correctly applied to paint band 22. As shown in these figures, each ring 26, 30 of voids 24 has been covered by primer 34, which indicates that primer 34 has been applied to paint band 22 along primer path 36, and indicates that primer 34 has been applied correctly along primer path 36. Please note that FIG. 2 is not to scale, and that the thicknesses of paint band 22, primer 34, and adhesive 23 have been exaggerated to illustrate a correct application of primer 34 to paint band 22 to cover voids 24.

While it is desirable that each ring 26, 30 of voids 24 are entirely covered after application of primer 34 because this verifies that the primer 34 has been correctly centered on paint band 22, it should be understood that each ring 26, 30 of voids 24 does not necessarily have to be entirely covered to verify that primer 34 has been applied to paint band 22. In this regard, the presence of primer 34 on paint band 22 can be verified if either of the rings 26, 30 are covered by primer 34. In other words, when each ring 26 and 30 are covered by primer 34 it can be verified that primer 34 is present and correctly applied (centered), and when both rings 26 and 30 are not completely covered it can be verified that primer 34 is present but not correctly applied (not centered). In addition, inasmuch as the application of primer 34 to paint band 22 can be an automated process conducted by a robot or some other mechanical automated application process, the coverage of each ring 26 and 30 can function as an acceptance criteria for the verification of the automated process (whether conducted by a robot or some or mechanical automated process).

Figure 4:
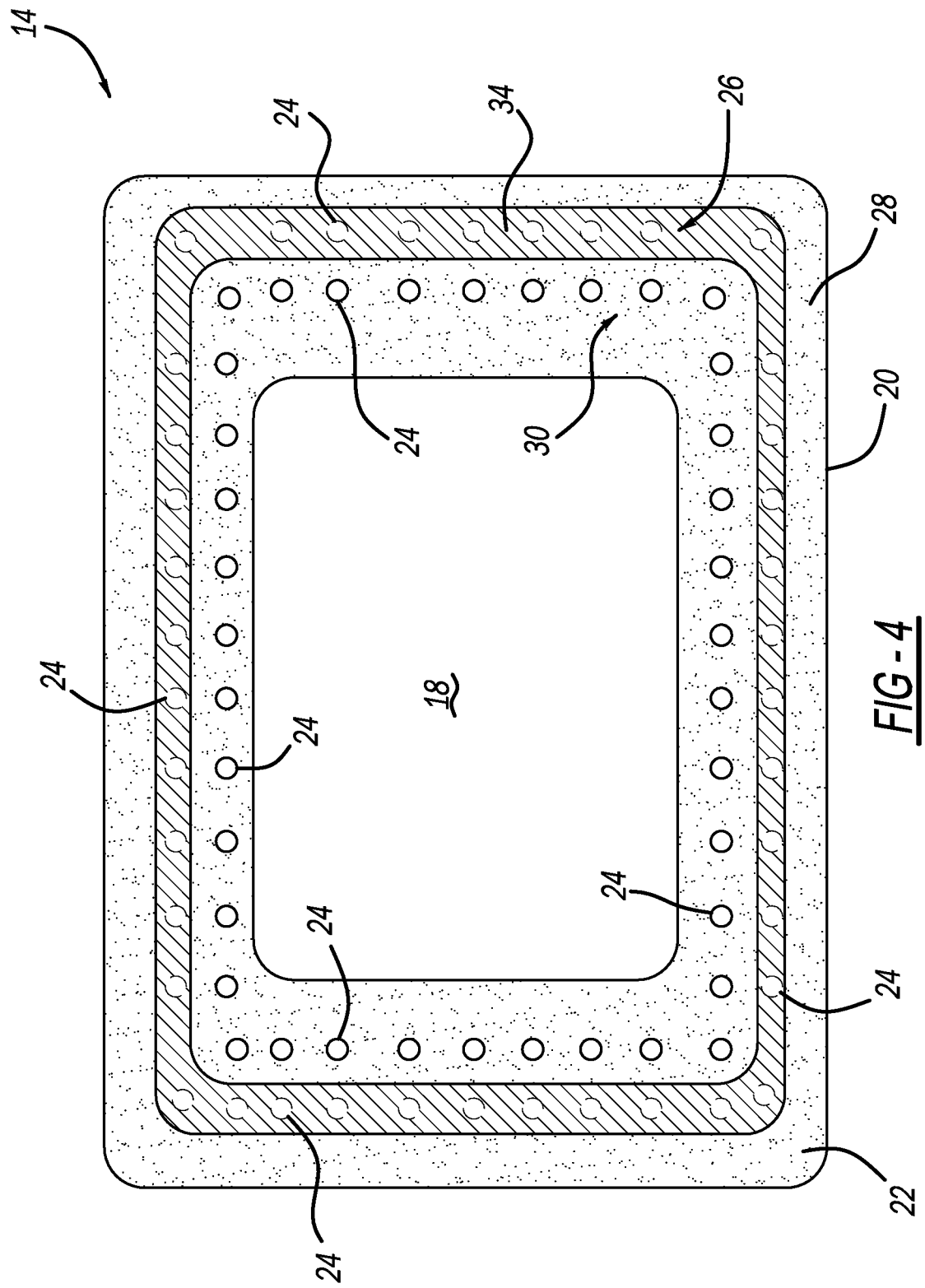
FIGS. 4 and 5 are schematic perspective views of glass panels illustrated in FIG. 2 after unacceptable applications of a primer.
Figure 5:
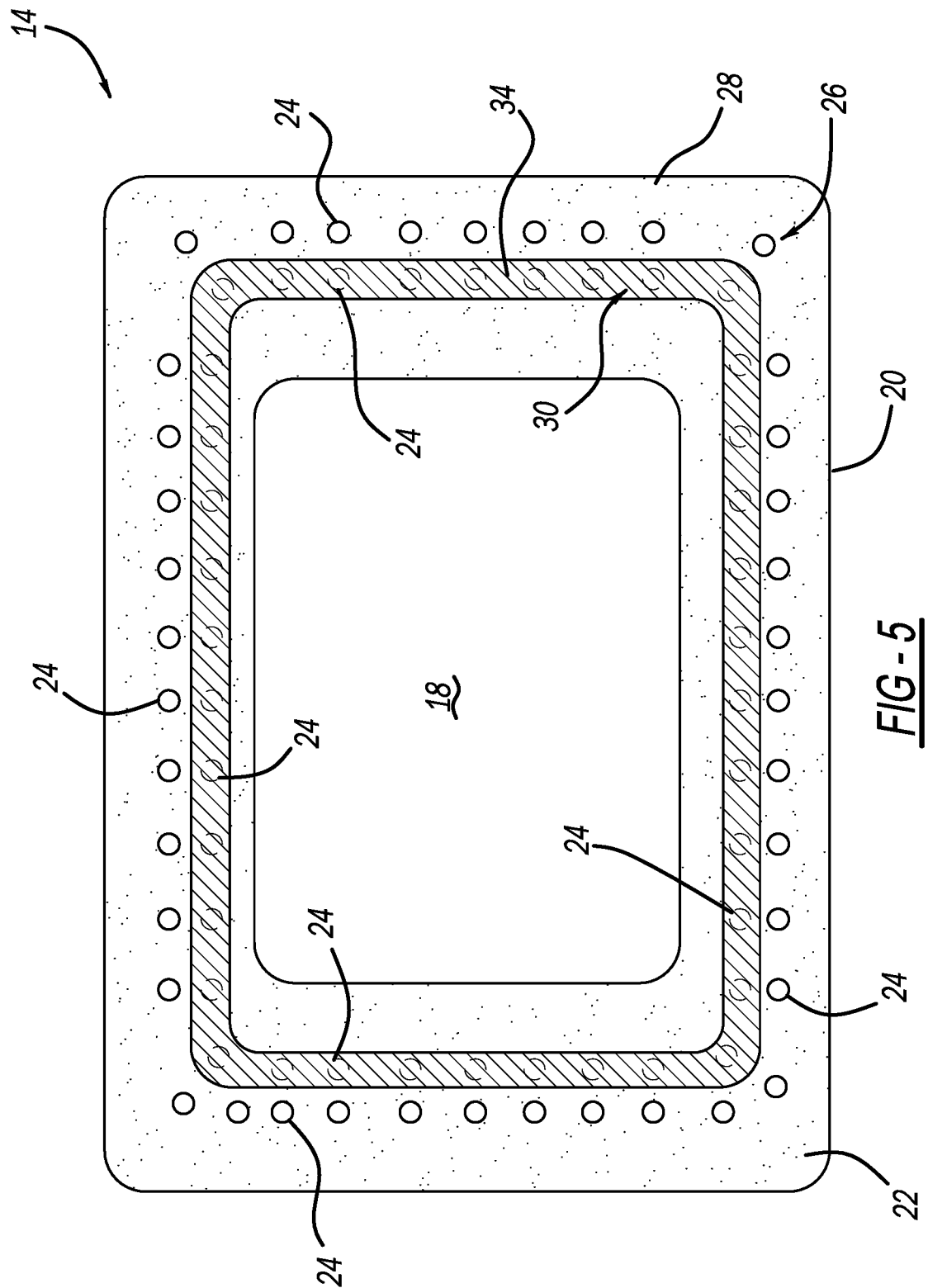

FIGS. 4 and 5 illustrate windshields 14 when primer 34 has been incorrectly applied to paint band 22. As can be seen in FIG. 4, primer 34 has been applied so as to overlap only outer ring 26 of voids 24. Similarly, in FIG. 5, primer 34 has been applied so as to overlap inner ring 30 of voids 24. In either case, it should be understood that the application of primer 24 to paint band 22 can be verified. Nonetheless, these windshields 14 should not be installed on vehicle 10 because primers 24 are at locations that are not centered on paint band 22, which prevents a guarantee that adhesive 23 will be positioned on primer 34 in manner that permits proper reaction (e.g., curing) with primer 24.

Figure 6:
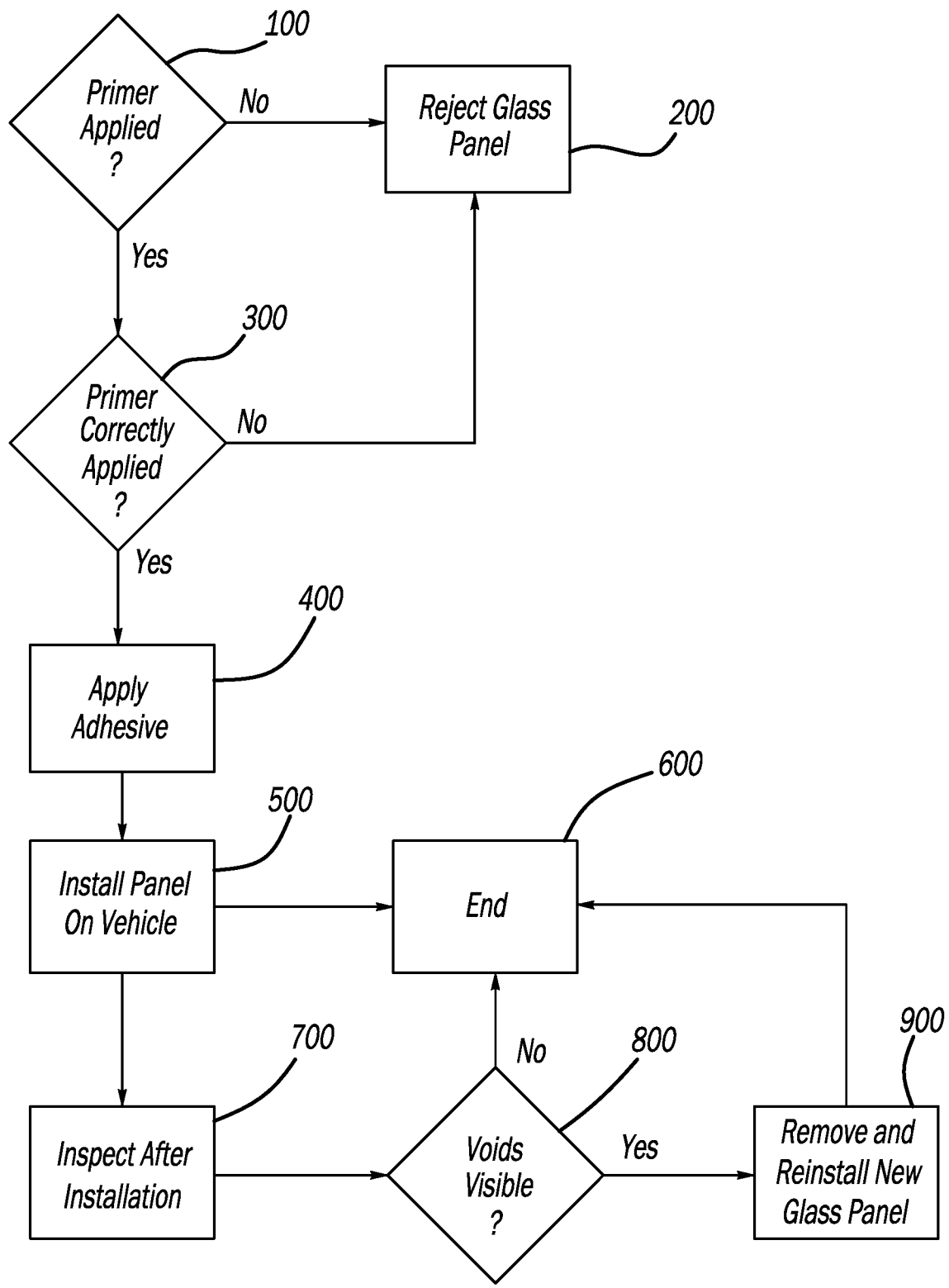
FIG. 6 is a flow chart illustrating a method of installing a glass panel on a vehicle according to a principle of the present disclosure.

Now referring to FIG. 6, a method of installing a glass panel 12 on vehicle 10 will be described. At block 100, a glass panel 12 has either been received from a supplier by the vehicle manufacturer with primer 34 already applied to paint band 22 or the glass panel 12 has been received by the vehicle manufacturer only with paint band 22 and the primer 34 needs to be applied to the paint band 22. In either case, at block 100, it must be determined whether primer 34 has been applied to paint band 22. This is accomplished by using voids 24 as a visual indicator. If at least some of the voids 24 are covered by primer 34, it can be determined whether that primer 34 has been applied to paint band 22. If no primer 34 has been detected, the glass panel 12 is rejected (block 200).

On the other hand, if primer 34 has been detected at block 100, it must be then be determined whether primer 34 has been correctly applied to paint band 22 (block 300). If voids 24 are visible after application of primer 34, the glass 12 is rejected (block 200). If no voids 24 are visible, it is determined that primer 34 has been correctly applied to primer path 36 and accepted for application of adhesive 23.

After determination that primer 34 has been correctly applied to primer path 36, adhesive 23 is applied to primer path 36 including primer 34 (block 400). Then, glass panel 12 may be installed on vehicle 10 (block 500). The process may then end (block 600). It should be understood, however, that vehicle 10 may be inspected after installation of glass panel 12 (block 700) to determine whether any of the previous steps were omitted. This may be accomplished by shining a light at paint band 22 of the installed glass panel 12 to determine whether any voids 24 are visible (block 800) If voids 24 are visible, vehicle 10 may be flagged for removal and proper reinstallation of glass panel 12 (block 900). If voids are not visible, it is determined that glass panel 12 was properly installed and the process may end (block 600). By using the above-described method, it can be verified that primer has been applied, and applied correctly, to paint band 22 prior to application of an adhesive and installation of glass panel 12 on vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method, comprising:
   providing a glass panel;
   disposing an opaque coating on the glass panel about a perimeter of the glass panel, the opaque coating having a plurality of voids provided therein where a material of the opaque coating is absent; and
   applying a primer to the opaque coating that is configured for receipt of an adhesive,
   wherein the plurality of voids serve as a visual guide for application of the primer to the opaque coating.

2. The method of claim 1, wherein the plurality of voids includes a first plurality of voids that are spaced apart from and aligned with each other such that a first ring of the first plurality of voids is formed along and proximate an outer edge of the opaque coating, and the plurality of voids includes a second plurality of voids that are spaced apart from and aligned with each other such that a second ring of the second plurality of voids is formed along and proximate an inner edge of the opaque coating.

3. The method of claim 2, wherein the first ring and the second ring are spaced apart from each other, and define a primer application path to guide the applying of the primer to the opaque coating.

4. The method of claim 3, wherein after the applying of the primer to the opaque coating, the method further comprises determining whether the primer has been correctly applied to the opaque coating by inspecting the glass panel to determine whether the plurality of voids have been covered by the primer.

5. The method of claim 4, wherein if the plurality of voids have been covered by the primer, the method further comprises applying the adhesive to the primer and installing the glass panel on a vehicle.

6. The method of claim 5, wherein a lack of visible voids permits primer presence and correct application thereof to be verified after installing the glass panel on the vehicle.

7. The method of claim 4, wherein the application of the primer to the opaque coating is an automated process, and coverage of the first and second rings of voids functions as an acceptance criteria for automated process verification.

8. The method of claim 4, wherein if some of the voids have not been covered by the primer, the method further comprises rejecting the glass panel.

9. The method of claim 3, wherein a center line between the first ring and the second ring defines a location for application of the adhesive to the primer.

10. The method of claim 1, wherein a color of the primer matches a color of the opaque coating.

11. The method of claim 1, wherein the glass panel is a laminated glass panel or a tempered glass panel.

12. A method of installing a glass panel on a vehicle, the glass panel including an opaque coating formed about a perimeter of the glass panel that includes a plurality of voids where the opaque coating is absent that are spaced apart from and aligned with each other about the perimeter of the glass panel, the method comprising:
    determining whether a primer has been applied to the opaque coating by inspecting the glass panel to determine whether at least some of the plurality of voids have been covered by the primer;
    after determining whether the primer has been applied to the opaque coating, determining whether the primer has been correctly applied to the opaque coating by inspecting the glass panel to determine whether each of the plurality of voids has been covered by the primer;
    after determining whether the primer has been correctly applied, applying an adhesive on the primer and installing the glass panel on the vehicle.

13. The method of claim 12, wherein the plurality of voids includes a first plurality of voids that are spaced apart from and aligned with each other such that a first ring of the first plurality of voids is formed along and proximate an outer edge of the opaque coating, and the plurality of voids includes a second plurality of voids that are spaced apart from and aligned with each other such that a second ring of the second plurality of voids is formed along and proximate an inner edge of the opaque coating.

14. The method of claim 13, wherein the first ring and the second ring are spaced apart from each other, and define a primer application path to guide the applying of the primer to the opaque coating.

15. The method of claim 13, wherein after the applying of the primer to the opaque coating, the method further comprises determining whether the primer has been correctly applied to the opaque coating by inspecting the glass panel to determine whether the first and second rings have been covered by the primer.

16. The method of claim 13, wherein a center line between the first ring and the second ring defines a location for application of the adhesive to the primer.

17. The method of claim 12, wherein if some of the voids have not been covered by the primer, the glass panel is rejected before applying the adhesive and installing the glass panel on the vehicle.

18. The method of claim 12, wherein if it is determined that the primer has not been applied to the opaque coating, the method further comprises applying the primer to the opaque coating using the plurality of voids as a guide for application of the primer.

19. The method of claim 12, wherein a color of the primer matches a color of the opaque coating.

20. The method of claim 12, wherein the glass panel is a laminated glass panel or a tempered glass panel.

* * * * *